(12) United States Patent
Davis

(10) Patent No.: US 6,577,944 B1
(45) Date of Patent: Jun. 10, 2003

(54) TRACTION CONTROL SYSTEM

(76) Inventor: Shannon R. Davis, 87 Woodland Hills Rd., Asheville, NC (US) 28804

( * ) Notice: Subject to any disclaimer, the term of this patent is extended or adjusted under 35 U.S.C. 154(b) by 78 days.

(21) Appl. No.: 09/845,590

(22) Filed: Apr. 30, 2001

Related U.S. Application Data

(63) Continuation-in-part of application No. 09/506,166, filed on Feb. 17, 2000.
(60) Provisional application No. 60/120,693, filed on Feb. 19, 1999.

(51) Int. Cl.$^7$ .............................. G06F 7/00; B60K 28/00
(52) U.S. Cl. ........................................ 701/82; 180/197
(58) Field of Search ............................... 701/82, 1, 53, 701/74; 180/197, 170; 303/121

(56) References Cited

U.S. PATENT DOCUMENTS

| 4,036,536 | A | 7/1977 | Quon |
|---|---|---|---|
| 4,484,280 | A | 11/1984 | Brugger et al. |
| 4,615,410 | A | 10/1986 | Hosaka |
| 4,763,912 | A | 8/1988 | Matsuda |
| 4,856,610 | A | 8/1989 | Leiber et al. |
| 4,873,639 | A | 10/1989 | Sato et al. |
| 5,179,526 | A | 1/1993 | Zimmer et al. |
| 5,181,175 | A | 1/1993 | Shiraishi et al. |
| 5,255,193 | A | 10/1993 | Katayose et al. |
| 5,269,391 | A | 12/1993 | Ito et al. |
| 5,293,315 | A | 3/1994 | Kolbe et al. |
| 5,351,779 | A | 10/1994 | Yamashita |
| 5,379,634 | A | * 1/1995 | Kuroda et al. ................. 73/116 |
| 5,388,895 | A | 2/1995 | Negrin |
| 5,404,304 | A | 4/1995 | Wise et al. |
| 5,405,301 | A | 4/1995 | Yagi et al. |
| 5,459,662 | A | 10/1995 | Tezuka et al. |
| 5,463,551 | A | 10/1995 | Milunas |
| 5,517,414 | A | 5/1996 | Hrovat |
| 5,519,617 | A | 5/1996 | Hughes et al. |
| 5,548,513 | A | 8/1996 | Masuda et al. |
| 5,797,108 | A | 8/1998 | Otsubo et al. |

\* cited by examiner

*Primary Examiner*—William A. Cuchlinski, Jr.
*Assistant Examiner*—Olga Hernandez
(74) *Attorney, Agent, or Firm*—Carter & Schnedler, P.A.

(57) ABSTRACT

There is provided a method for controlling the driving traction of a wheel on a surface to reduce slippage of the wheel on the surface without the need to monitor the rotational speed of the wheel where the wheel is driven by a power unit. A threshold value of maximum acceptable acceleration for the power unit is established. The rotational speed of the power unit is measured for a first selected time interval. The rotational speed of the power unit is measured for a second selected time interval. The difference between the rotational speed of the power unit in the second time interval and the rotational speed of the power unit in the first time interval is determined. The difference between the rotational speed of the power unit in the second and first time intervals are compared with the established threshold value. If the difference in rotational speed of the power unit is greater than the established threshold value, a corrective action is initiated to reduce the rotational speed of the power unit.

22 Claims, 3 Drawing Sheets

TRACTION CONTROL SYSTEM

RELATION TO PRIOR APPLICATIONS

This Application is based on Provisional Application Serial No. 60/120,693, filed Feb. 19, 1999. This is a continuation-in-part of U.S. patent application Ser. No. 09/506,166, filed Feb. 17, 2000.

FIELD OF THE INVENTION

The present invention relates to the field of driving traction control and more particularly to a method for measurement of loss of traction between a drive wheel and a surface.

BACKGROUND OF THE INVENTION

Traction of a vehicle is established through the constant and reliable contact of a wheel against a surface so that the wheel, when rotated by means of a driving force, will propel the vehicle along the surface in a selected direction. In the context of the present invention, traction refers to driving traction, not to braking traction. Traction results from the combination of the coefficient of friction and the force of the wheel against the surface. The force, or weight, of the wheel is directed vertically downward and may be analytically split into a proportional force normal to the surface and a proportional force parallel to the surface. The force normal to the surfaces is a part of the traction frictional force. The drive force is applied from the wheel to the surface along the tangent at the contact point of the wheel and the surface. A drive force, known as torque, that is great enough will overcome the frictional grip between the wheel and the surface and cause the wheel to slip in relation to the surface so that the wheel is rotating at a higher surface speed than its forward travel velocity. Once the frictional grip, or static friction, between the wheel and the surface is overcome by excess torque relative to the coefficient of friction, sliding or kinetic friction occurs. Kinetic friction is always less than static friction, providing a greater opportunity for slippage of the wheel and ultimately the vehicle. If the drive force that was sufficient to overcome static friction continues to be applied to the wheel, and the rotational speed of the wheel is restrained only by kinetic friction, the wheel will continue to rotate at a faster and faster speed.

The wheel slippage situation described above occurs frequently in driving an automobile. The slippage can occur due to excessive accelerative force applied to the wheels or due to inadequate wheel-to-road friction, e.g., due to inclement weather. Once a slippage condition begins, the driver has less control of the speed or direction of travel of the automobile. Automobile drivers typically attempt to control this slippage by reducing the speed at which the driving wheel is rotating, either by reducing the engine power through gasoline control or by applying the car's brakes. Of course, the driver must first recognize the fact that slippage is occurring, then decide what is the proper correction to be made, then make the correction; all of this mental processing and reacting takes time. When driving in such conditions, the amount of time for a driver to evaluate and act on a situation is limited. If slippage occurs, for example, to a race car driver driving on a track and commonly traveling at a speed in excess of 240 kilometers (150 miles) an hour, the time available is very small and the ability to act correctly within that time is critical.

Numerous inventions have been directed to automatic control of slippage of a wheel against a road surface. In the prior art, automotive traction control systems disclosed in U.S. Pat. No. 5,519,617 to Hughes et al and U.S. Pat. No. 5,548,513 to Masuda et al are typical of those that employ a comparison of the rotational speed of the driven wheels to the rotation speed of the idler wheels to determine wheel slippage is occurring. According to these prior inventions, the maker of the vehicle must provide a speed sensor for each wheel whose speed is to be measured. Providing a wheel speed sensor at each of four wheels involves an added expense to the automobile. U.S. Pat. No. 4,615,410 to Hosaka discloses a system by which a target vehicle speed is determined by the vehicle gear selected, accelerator pedal position, and brake position, whereupon the target vehicle is compared to the rotational speed of a wheel of the vehicle to determine whether slippage is occurring. The system of the Hosaka patent is complex and potentially unreliable. A particular drawback of the known systems that compare the speed of a driven wheel with the speed of an idler wheel is that with a four wheel-drive vehicle, all wheels rotate at substantially the same speed at all times, and this system is inoperative.

The engine of most modern automobiles are equipped with a speed sensor that is adapted to provide information to an engine management system which regulates fuel, air, ignition timing, and other such operating factors. A system for determining wheel slippage, thus the need for traction control, that would utilize the existing engine speed sensor would avoid the need for the maker or owner of an automobile to add wheel-mounted speed sensors. Since the modern automobile engine management system is controlled by a microprocessor, and the existing engine speed sensor sends speed indicative signals to the microprocessor, modification of the engine management program to include traction control factors would accomplish this important goal reliably with a minimum of added cost. While a microprocessor is the preferred embodiment of the invention, it is recognized that similar results could be achieved by other devices capable of comparing two factors against each other. Traction control requires reducing the rotational speed of the drive wheels to match their travel over the road. Wheel rotational speed can be reduced by such factors as braking, fuel reduction, and ignition timing, amongst others. The choice of one or more of these control factors may be made on the basis of the degree of wheel acceleration that is occurring and road conditions.

Therefore, it is an object of the present invention to provide a traction control system for an automobile that determines wheel slippage and generates an automatic corrective action therefor.

It is an additional object of the present invention to provide a traction control system for an automobile that determines wheel slippage by means of an existing engine speed sensor.

It is a further object of the present invention to provide a traction control system for an automobile that generates an automatic corrective action in proportion to the degree of acceleration of the wheel.

These and other objects of the invention will become apparent from the disclosure to follow.

SUMMARY OF THE INVENTION

One form of the present invention provides a method for improving the traction control of an automobile that utilizes an existing engine speed sensor to determine the occurrence and degree of wheel slippage and generates an automatic corrective action to the engine, the vehicle's braking system, or both, that is proportional to the degree by which the wheel is slipping. The traction control method of the present invention uses a computer program to evaluate a slippage situation and determine the amount of correction needed. The method provides for a series of measurements of the speed of engine or transmission rotation as determined by the existing sensors, comparing a first speed measurement to a second speed measurement, determining their difference, and comparing a selected maximum acceleration. In one embodiment of the invention, the selected maximum acceleration is manually set to a preset threshold. In another embodiment of the invention, the selected maximum acceleration is determined by constantly updating the average rate of acceleration of the engine. If the difference in speed measurements exceeds the limit, slippage is occurring. The degree to which the speed difference exceeds the selected limit determines the extent of needed corrective action.

BRIEF DESCRIPTION OF THE DRAWINGS

In order for the invention to become more clearly understood, it will be disclosed in greater detail with reference to the accompanying drawings, in which.

DESCRIPTION OF THE PREFERRED EMBODIMENTS

Figure 1:
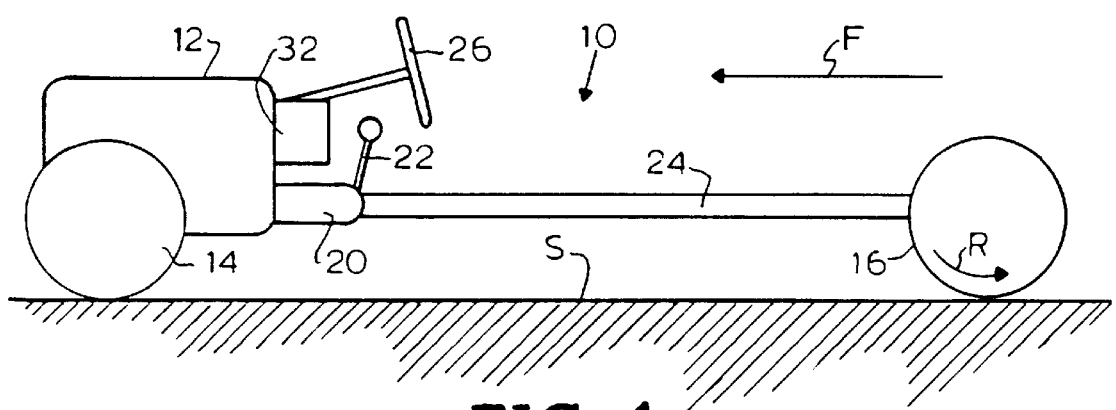
FIG. 1 is a schematic representation of the drive system of an automobile driving on a level road surface.

In relation to the foregoing objects of the invention, FIG. 1 schematically illustrates the drive system of automobile 10 driving on level road surface S. Automobile 10 comprises engine 12, front wheels 14, and driving wheels 16. The term "engine" is used to designate any power unit, e.g., an internal combustion engine or an electric motor. Engine 12 is connected to drive wheels 16 by transmission 20 and drive shaft 24. An engine management system, as is known in the art, is represented by numeral 32. Engine management system 32 includes a microprocessor adapted to receive signals indicative of the speed and condition of engine 12 and to generate signals responsive thereto for adjusting various engine operating parameters accordingly. Transmission 20 is controlled by gear shift lever 22, and may portray a manual or an automatic transmission, since the principles of the invention pertain to either. Directional control of automobile 10 is achieved through steering wheel 26. As engine 12 transmits power through transmission 20 and drive shaft 24 to drive wheels 16, drive wheels 16 are caused to rotate in the direction indicated by arrow R and automobile 10 is caused to travel in the direction indicated by arrow F. The vehicle illustrated in FIG. 1 is depicted with a "rear wheel" drive system. It is recognized that the benefits of the present invention are also obtained when applied to an automobile using a front wheel drive system.

To move automobile 10 forward from a stopped condition, or to increase the forward speed thereof, the torque transmitted from engine 12 to drive wheels 16 is increased, increasing the power applied at the interface between drive wheels 16 and road surface S. As long as the traction, determined by the weight on drive wheels 16 times the static coefficient of friction of the wheels against road surface S, is greater than the torque delivered to the driving wheels, the torque will cause the speed of forward travel F of automobile 10 to increase, i.e., automobile 10 will accelerate. Static friction prevails when two surfaces in contact maintain the same rate of motion, i.e., when the surface speed of the rotating wheel equals the forward travel of the vehicle. However, if the traction is reduced because of a lowering in coefficient of friction, or if the torque increases to a value greater than the static friction, drive wheels 16 begin to slip on road surface S and kinetic friction prevails, having a lower value than static friction. Kinetic friction occurs when the two surfaces in contact have different rates of motion.

Under conditions of ordinary power application, without slippage, automobile 10 will accelerate. As automobile 10 moves faster, engine 12 will rotate faster, assuming no change in gear ratio. It is to be understood that since the torque to drive wheels 16 is necessarily higher in first gear than in the other gears, if a loss of traction is possible, it will often occur when the transmission is in first gear. Therefore, for purposes of traction control, it is often only necessary to account for the engine speed changes that occur in first gear.

The degree of acceleration of an automobile of known weight and power will not exceed a maximum value which can be calculated. However, under conditions of wheel slippage, automobile 10 will not move forward faster, but engine 12 will rotate faster. Although an automobile will accelerate faster going downhill than uphill, the difference between acceleration under the downhill and uphill conditions is deemed to be small compared to engine speed changes when traction is lost. Since the friction between road surface S and drive wheel 16 is lower under conditions of slip (kinetic friction) than when wheel 16 rotates at the same surface speed as it moves relative to the road (static friction), once wheels 16 begin to slip, it will keep accelerating to a faster and faster speed. Engine 12 will accelerate at a similar rate to that of wheels 16. Thus, indications of excessive engine speed change relate directly to conditions of wheel slippage.

Figure 2:
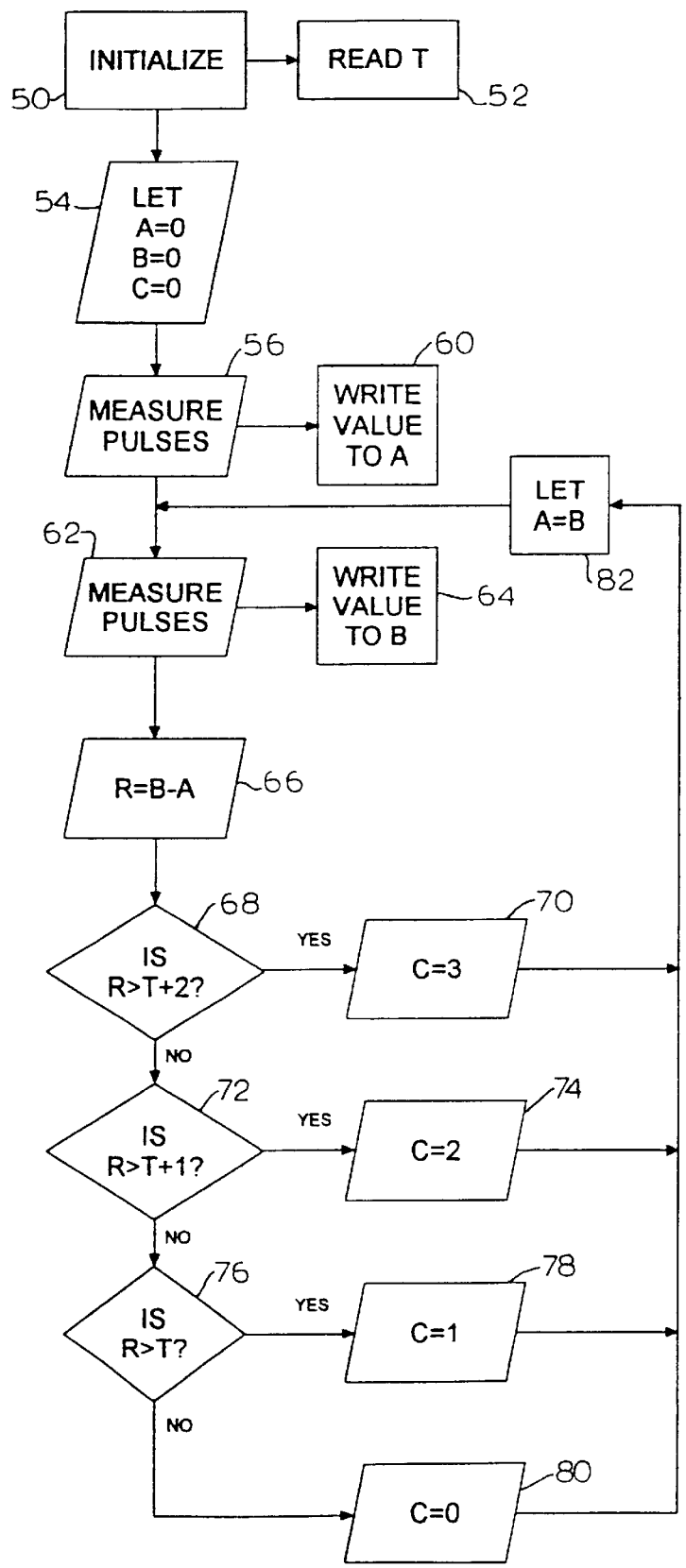
FIG. 2 is a flow chart showing the operative steps of one embodiment of the invention disclosed.

Once a determination of slippage has been made, i.e., the difference between engine speed during a first time period and the engine speed during a second time period exceeds a reasonably expected maximum difference under traction-controlled conditions for the specific automobile (a slippage threshold) a correction must be made. A slippage threshold is established on the basis of the automobile weight, engine power, tire size and type, and road conditions. In one embodiment of the invention, as shown in FIG. 2, a threshold variable to account for different road conditions is established manually upon starting the invention system. Correction to overcome slippage and restore traction can be accomplished by a number of methods, including, but not limited to, reduction of fuel fed to engine 12, varying the timing of the spark ignition or applying wheel braking. As noted above, these methods are adequately disclosed in the prior art. The present invention is equally adapted to any correction method used, including, but not limited to, those noted herein. One aspect of the invention focuses on the method of determining slippage and applying a differential correction depending on the degree of engine acceleration in excess of the pre-selected threshold.

Referring now to FIG. 2, a flowchart of one of the methods of the present invention is illustrated. Upon starting automobile 10, the system microprocessor, as is known in the art (not shown) initialize the program at box 50, including the step of reading a preset value for threshold T at box 52 and setting a threshold factor relating to road conditions. Threshold T is preferably established for a specific vehicle and permanently embedded in the microprocessor's memory. Data are set at step 54 to make variables A and B equal to zero and slip correction C equal to zero. The system now moves to step 56 to instruct the engine speed sensor to measure pulses related to the rotational speed of the engine over a first selected time interval and to assign the value obtained to variable A at step 60. The system next measures pulses in a second selected time interval to obtain engine speed in step 62, writing this value to variable B at step 64. Next, the system subtracts the engine speed value A from the value B to determine as result R in step 66. Result R is now compared to several numbers related to threshold T. The numerical values stated herein are offered as examples and may be changed in commercial embodiment to any appropriate number to relate to the time period over which engine rotation is measured. In step 68, it is determined whether result R is greater than threshold T plus 2, indicating a relatively high level of slippage. Conclusions derived from decision steps shown in the flowchart are underlined in the discussion to follow. If the answer determined is yes, a level 3, or maximum correction C, as discussed above, is invoked at step 70. A maximum correction may be, e.g., wheel braking and a reduction of fuel fed to engine 12. If the answer is no, the program moves to step 72, where it is determined whether result R is greater than threshold T plus 1, indicating a moderate degree of slippage. If this answer is yes, a level 2, or medium correction, is invoked at step 74. A medium correction may be, e.g., a reduction in fuel fed to engine 12. A no response moves the program to step 76 to determine whether R is greater than threshold T, indicating a minimal degree of slippage. A yes response moves to invoke a minimal correction C=1 at step 78, while a no response sets the correction level to zero at step 80. A minimal correction may be accomplished, for example, by retarding the spark timing of engine 12. Termination of steps 70, 74, 78, and 80 signals the program at step 82 to let the prior value for variable B be assigned to variable A. This last step installs the value of the most recent engine speed measurement, previously identified as "B", into variable A, thereby only measuring engine speed once and comparing the more recent speed measurement to the prior known speed reading at step 66.

In the embodiment of FIG. 2, the system monitors engine speed to determine the rate of acceleration and compares that rate to a preset threshold. That preset threshold is the limit of acceleration of engine speed, that is actually transmitted to the drive wheels. Anything over that limit is considered to be wheel spin. The preset threshold is set by the user with, in the case of a race car, on track testing in high gear. One drawback with this method is that the rate of acceleration of the engine changes in different gears. The rate of acceleration of the engine is higher in lower gears, causing the system of FIG. 2 to determine that the rate of acceleration of the engine is greater than the preset threshold. This may cause the system to assume that the tires are slipping even when the tires were not slipping.

An alternative system described below overcomes this problem. The system shown in FIG. 3 "learns" the threshold described above by constantly updating the average rate of acceleration of the engine. That rate is then set to be the threshold for the current cycle. This cycle is a continuous loop and is constantly updating the threshold. Any sudden gain in the rate of acceleration is detected as a spike above that threshold. These spikes are the result of wheelspin. Therefore, the new system is in effect a means of determining wheelspin that can automatically calibrate itself in any gear, among other variables, such as road surface, weather and driving style.

Figure 3:
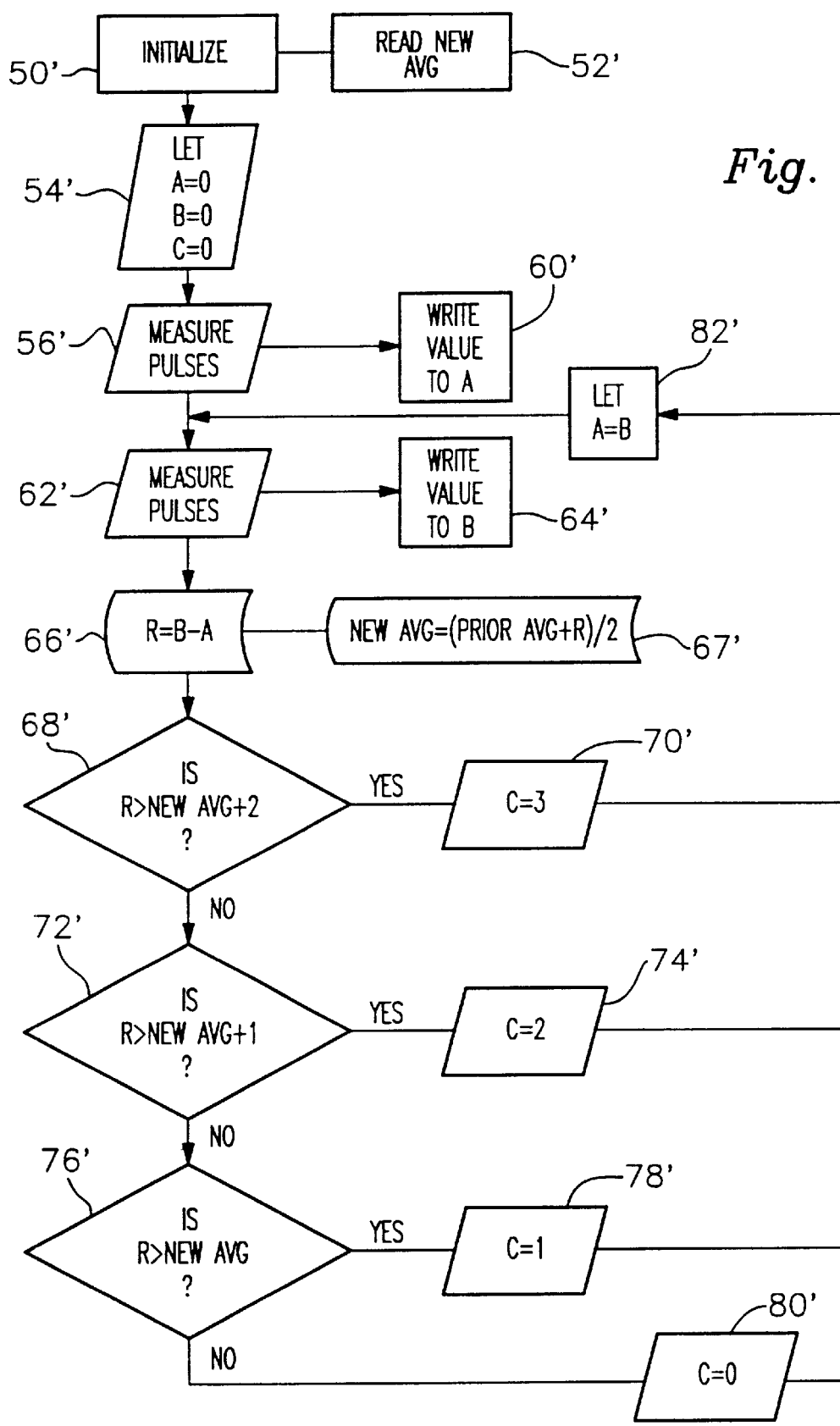
FIG. 3 is a flow chart showing the operative steps of another embodiment of the invention disclosed.

Referring now to FIG. 3, a flowchart of the method of the present invention is illustrated. Upon starting automobile 10, the system microprocessor, as is known in the art (not shown) initialize the program at box 50', including the step of reading a preset value for threshold NEW AVG at box 52' and setting a threshold factor relating to road conditions. Threshold NEW AVG is established for a vehicle continuously as it is operated. In step 67' the threshold NEW AVG is updated each time the system cycles. This provides a means for the system to automatically adjust for changing conditions, such as road surface, weather, gear selection and driving style. Data are set at step 54' to make variables A and B equal to zero and slip correction C equal to zero. The system now moves to step 56' to instruct the engine speed sensor to measure pulses related to the rotational speed of the engine over a first selected time interval and to assign the value obtained to variable A at step 60'. The system next measures pulses in a second selected time interval to obtain engine speed in step 62', writing this value to variable B at step 64'. Next, the system subtracts the engine speed value A from the value B to determine as result R in step 66'. Result R is now compared to several numbers related to threshold NEW AVG. In step 67' a new average rate of acceleration is determined by averaging the last and current results. That is, the prior average rate of acceleration is added to result R and is divided by two. This establishes a new threshold for box 52'. The numerical values stated herein are offered as examples and may be changed in commercial embodiment to any appropriate number to relate to the time period over which engine rotation is measured. In step 68', it is determined whether result R is greater than threshold NEW AVG plus 2, indicating a relatively high level of slippage. Conclusions derived from decision steps shown in the flowchart are underlined in the discussion to follow. If the answer determined is yes, a level 3, or maximum correction may be, e.g., wheel braking and a reduction of fuel fed to engine 12 and is invoked at step 70'. If the answer is no, the program moves to step 72', where it is determined whether result R is greater than threshold NEW AVG plus 1, indicating a moderate degree of slippage. If this answer is yes, a level 2, or medium correction, is invoked at step 74'. A medium correction may be, e.g., a reduction in fuel fed to engine 12. A no response moves the program to step 76' to determine whether R is greater than threshold NEW AVG, indicating a minimal degree of slippage. A yes response moves to invoke a minimal correction C=1 at step 78', while a no response sets the correction level to zero at step 80'. A minimal correction may be accomplished, for example, by retarding the spark timing of engine 12. Termination of steps 70', 74', 78', and 80' signals the program at step 82' to let the prior value for variable B be assigned to variable A. This last step installs the value of the most recent engine speed measurement, previously identified as "B", into variable A, thereby only measuring engine speed once and comparing the more recent speed measurement of the prior known speed reading at step 66'.

As described above, the invention system, once initialized, compares two successive engine speed readings as measured with an existing engine speed sensor and determines to what extent, if any, the difference in speed exceeds a selected threshold factor. If the difference of the two successive engine speed readings exceeds the threshold, wheel slippage relative to the road surface is occurring. The size of the interval over the established threshold will invoke a proportional correction. It will be understood that the engine speed sensor is constantly monitoring the speed of the engine and generating signals related thereto. The signals are received and utilized by the invention program to determine the need for and degree of correction to eliminate slippage.

The present invention further contemplates applications to power drive apparatus other than automotive where a drive unit applies torque to a rotating component that must overcome a resistance. One example is a turbine, where an electric drive motor rotates to cause the turbine to accelerate from zero to a desired speed. Under normal conditions, the turbine will gradually increase speed until it reaches its designed revolutions per minute. If the connection between the drive motor and the turbine is slipping, however, the turbine will not accelerate normally and the motor will accelerate at a considerably higher speed than usual. Measurement of that motor's acceleration speed according to the significant damage to, or at least inefficiency, of the drive motor and turbine. Corrective action in this case could be a reduction of the voltage applied to the drive motor. A second example of non-automotive use of the present invention is a power boat in which the boat's internal combustion motor drives a propeller, or screw. Although slippage between the motor shaft and the screw is not common, the boat may experience cavitation where the screw rotates in excess of design speed and causes significant low pressure pockets behind the screw blades. Cavitation generally results in damage to the screw surface and is to be avoided. By use of the present invention, the rotational speed involved in cavitation could be readily determined and then controlled through, for example, fuel feed reduction.

The above-detailed description of the preferred embodiments of the invention sets forth the best mode contemplated by the inventor for carrying out the invention and is provided by way of example and not as a limitation of its scope. Accordingly, various modifications and variations obvious to a person of ordinary skill in the art to which it pertains are deemed to lie within the scope and spirit of the invention as set forth in the following claims.

What is claimed is:

1. A method for controlling the driving traction of a wheel on a surface to reduce slippage of the wheel on the surface without the need to monitor the rotational speed of the wheel where said wheel is driven by a power unit, comprising the steps of:

(a) establishing a threshold value of maximum acceptable acceleration for said power unit;

(b) measuring the rotational speed of said power unit for a first selected time interval;

(c) measuring the rotational speed of said power unit for a second selected time interval;

(d) determining the difference between the rotational speed of said power unit in said second time interval and the rotational speed of said power unit in said first time interval;

(e) comparing the difference between the rotational speed of said power unit in said second and first time intervals with said established threshold value; and (f) if the difference in rotational speed of said power unit is greater than the established threshold value, initiating corrective action to reduce the rotational speed of said power unit.

2. The method for controlling the traction of a wheel on a surface as described in claim 1, further comprising the steps of determining the magnitude to which the difference in rotational speed of the power unit exceeds the established threshold value and causing said corrective action to be proportional to the magnitude.

3. The method for controlling the traction of a wheel on a surface as described in claim 2, wherein if the magnitude of difference is relatively high, the corrective action is at a maximum level.

4. The method for controlling the traction of a wheel on a surface as described in claim 2, wherein if the magnitude of difference is moderate, the corrective action is at a medium level.

5. The method for controlling the traction of a wheel on a surface as described in claim 2, wherein if the magnitude of difference is small, the corrective action is at a minimum level.

6. A method for controlling a rotary device being driven against a resistance by a power unit to reduce inefficiency of the rotary device without the need to monitor the rotational speed of the rotary device, comprising the steps of:

(a) establishing a threshold value of maximum acceptable acceleration for said power unit;

(b) measuring the rotational speed of said power unit for a first selected time interval;

(c) measuring the rotational speed of said power unit for a second selected time interval;

(d) determining the difference between the rotational speed of said power unit in said second time interval and the rotational speed of said power unit in said first time interval;

(e) comparing the difference between the rotational speed of said power unit in said second and first time intervals with said established threshold value; and (f) if the difference in rotational speed of said power unit is greater than the established threshold value, initiating corrective action to reduce the rotational speed of said power unit rotary device.

7. The method for controlling a rotary device as described in claim 6, further comprising the steps of determining the magnitude to which the difference in rotational speed of the power unit exceeds the established threshold value and causing said corrective action to be to the magnitude.

8. The method for controlling the rotary device as described in claim 7, wherein if the magnitude of difference is relatively high, the corrective action is at a maximum level.

9. The method for controlling the rotary device as described in claim 7, wherein if the magnitude of difference is moderate, the corrective action is at a medium level.

10. The method for controlling the rotary device as described in claim 7, wherein if the magnitude is small, the corrective action is at a minimum level.

11. A method for controlling the driving traction of a wheel on a surface to reduce slippage of the wheel on the surface without the need to monitor the rotational speed of the wheel where said wheel is driven by a power unit, comprising the steps of:

(a) calculating an average acceleration of the rotational speed of said power unit;

(b) establishing a threshold value of maximum acceptable acceleration for said power unit based on the calculated average acceleration of said power unit;

(c) measuring the rotational speed of said power unit for a first selected time interval;

(d) measuring the rotational speed of said power unit for a second selected time interval;

(e) determining the difference between the rotational speed of said power unit in said second time interval and the rotational speed of said power unit in said first time interval;

(f) comparing the difference between the rotational speed of said power unit in said second and first time intervals with said established threshold value; and (g) if the difference in rotational speed of said power unit is greater than the established threshold value, initiating corrective action to reduce the rotational speed of said power unit.

12. The method for controlling the traction of a wheel on a surface as described in claim 11, wherein the average acceleration of the rotational speed of said power unit is a calculated plurality of times over successive time periods an average acceleration of the rotational speed of said power unit is accomplished by averaging the difference between the rotational speed of the power unit in said second and first time intervals and the previously calculated average acceleration in the most previously average acceleration of the rotational speed of said power unit.

13. The method for controlling the traction of a wheel on a surface as described in claim 11, further comprising the steps of determining the magnitude to which the difference in rotational speed of the power unit exceeds the established threshold value and causing said corrective action to be proportional to the magnitude.

14. The method for controlling the traction of a wheel on a surface as described in claim 13, wherein if the magnitude of difference is relatively high, the corrective action is at a maximum level.

15. The method for controlling the traction of a wheel on a surface as described in claim 13, wherein if the magnitude of difference is moderate, the corrective action is at a medium level.

16. The method for controlling the traction of a wheel on a surface as described in claim 13, wherein if the magnitude of difference is small, the corrective action is at a minimum level.

17. A method for controlling a rotary device being driven against a resistance by a power unit to reduce inefficiency of the rotary device without the need to monitor the rotational speed of the rotary device, comprising the steps of:

(a) calculating an average acceleration of the rotational speed of said power unit;

(b) establishing a threshold value of maximum acceptable acceleration for said power unit based on the calculated average acceleration of said power unit;

(c) measuring the rotational speed of said power unit for a first selected time interval;

(d) measuring the rotational speed of said power unit for a second selected time interval;

(e) determining the difference between the rotational speed of said power unit in said second time interval and the rotational speed of said power unit in said first time interval;

(f) comparing the difference between the rotational speed of said power unit in said second and first time intervals with said established threshold value; and (g) if the difference in rotational speed of said power unit is greater than the established threshold value, initiating corrective action to reduce the rotational speed of said power unit rotary device.

18. The method for controlling the traction of a wheel on a surface as described in claim 17, wherein the average acceleration of the rotational speed of said power unit is a calculated plurality of times over successive time periods an average acceleration of the rotational speed of said power unit is accomplished by averaging the difference between the rotational speed of the power unit in said second and first time intervals and the previously calculated average acceleration in the most previously average acceleration of the rotational speed of said power unit.

19. The method for controlling a rotary device as described in claim 17, further comprising the steps of determining the magnitude to which the difference in rotational speed of the power unit exceeds the established threshold value and causing said corrective action to be to the magnitude.

20. The method for controlling the rotary device as described in claim 17, wherein if the magnitude of difference is relatively high, the corrective action is at a maximum level.

21. The method for controlling the rotary device as described in claim 17, wherein if the magnitude of difference is moderate, the corrective action is at a medium level.

22. The method for controlling the rotary device as described in claim 17, wherein if the magnitude is small, the corrective action is at a minimum level.

\* \* \* \* \*